United States Patent
Baldwin et al.

(10) Patent No.: US 8,794,000 B2
(45) Date of Patent: Aug. 5, 2014

(54) NATURAL GAS COMPRESSION SYSTEM

(75) Inventors: Darryl Dean Baldwin, Lafayette, IN (US); Gary Nelson Boyer, Lafayette, IN (US); William Christopher Boley, Lafayette, IN (US); Joel D. Hiltner, Bellingham, WA (US)

(73) Assignee: Caterpillar Inc., Peoria, IL (US)

( * ) Notice: Subject to any disclaimer, the term of this patent is extended or adjusted under 35 U.S.C. 154(b) by 1467 days.

(21) Appl. No.: 12/292,652

(22) Filed: Nov. 24, 2008

(65) Prior Publication Data

US 2009/0139230 A1    Jun. 4, 2009

Related U.S. Application Data

(60) Provisional application No. 61/004,770, filed on Nov. 30, 2007.

(51) Int. Cl.
*F02B 37/04* (2006.01)
*F02B 33/34* (2006.01)

(52) U.S. Cl.
USPC .......................................... 60/612; 123/562

(58) Field of Classification Search
USPC ............ 60/609, 610, 611, 612; 123/527, 541, 123/562, 3
See application file for complete search history.

(56) References Cited

U.S. PATENT DOCUMENTS

| | | | |
|---|---|---|---|
| 2,776,087 A * | 1/1957 | Walter | 417/390 |
| 4,730,457 A | 3/1988 | Yamada et al. | |
| 4,903,488 A * | 2/1990 | Shibata | 60/609 |
| 5,471,965 A | 12/1995 | Kapich | |
| 5,615,554 A | 4/1997 | Gobert | |
| 6,273,076 B1 | 8/2001 | Beck et al. | |
| 6,343,473 B1 | 2/2002 | Kanesaka | |
| 6,354,268 B1 | 3/2002 | Beck et al. | |
| 6,474,323 B1 | 11/2002 | Beck et al. | |
| 6,502,398 B2 | 1/2003 | Kapich | |
| 6,688,280 B2 | 2/2004 | Weber et al. | |
| 6,868,840 B2 | 3/2005 | Lewallen | |
| 6,990,814 B2 * | 1/2006 | Boley et al. | 60/611 |
| 8,141,361 B2 * | 3/2012 | Andersen | 60/611 |
| 2004/0194466 A1 | 10/2004 | Kawamura et al. | |
| 2004/0206083 A1 | 10/2004 | Okuyama et al. | |
| 2007/0234715 A1 * | 10/2007 | Willi et al. | 60/320 |

FOREIGN PATENT DOCUMENTS

| | | | |
|---|---|---|---|
| GB | 2420152 A * | 5/2006 | |
| JP | 5-256150 | 10/1993 | |
| JP | 8-218883 | 8/1996 | |

* cited by examiner

*Primary Examiner* — Tran Nguyen
*Assistant Examiner* — Leda Pham
(74) *Attorney, Agent, or Firm* — Finnegan, Henderson, Farabow, Garrett & Dunner LLP

(57) ABSTRACT

A natural gas compression system is provided. The system may include a natural gas compressor configured to compress, and thereby pump, natural gas through a pipeline. The system may also include a natural gas burning engine, operatively coupled to the gas compressor, the engine being supplied with air by an induction system. The induction system may include a supercharger driven by the engine and configured to compress intake air and a turbocharger downstream from the supercharger and driven by exhaust gases produced by the engine. The induction system may also include a supercharger compressor bypass configured to selectively recirculate a portion of the compressed output of the supercharger upstream of the supercharger.

19 Claims, 2 Drawing Sheets

NATURAL GAS COMPRESSION SYSTEM

PRIORITY

This application claims the benefit of priority under 35 U.S.C. §119(e) to U.S. Provisional Application No. 61/004,770, filed Nov. 30, 2007.

TECHNICAL FIELD

The present disclosure relates to a natural gas compression system and, more particularly, to a natural gas compression system including a compressor driven by a natural gas engine supplied with forced induction from both a turbocharger and a supercharger.

BACKGROUND

In combustion engines, particularly turbocharged natural gas engines, exhaust temperatures increase significantly near the upper end of an engine's operating range and/or at high altitudes. The high exhaust temperatures under these conditions are caused by the high exhaust manifold pressure required for such operations due to increased pumping work required of the turbocharger. The elevated exhaust manifold pressure causes slow combustion and reduces the margin for detonation, requiring retarded timing, thus reducing performance, efficiency, etc. Turbomachinery may often be detuned to maintain engine operation within the limits imposed by the elevated backpressure and elevated exhaust temperatures.

Also, engine speed in natural gas engines is often limited by exhaust temperature. Therefore it can be desirable to find ways to configure and operate natural gas engines in such a way as to produce lower exhaust temperatures in order to improve various aspects of engine performance. In turbocharged systems, the presence of the turbine in the exhaust flow path increases backpressure in the exhaust, which leads to higher exhaust temperatures. Exhaust temperatures may also be elevated due to high compression ratios, which may be used to improve performance. Thus, although the use of turbochargers and high compression ratios can improve performance, turbochargers and high compression ratios tend to increase exhaust temperatures to a degree that limits any potential performance improvements provided by turbochargers and high compression ratios.

In some cases, backpressure created by a turbocharger may elevate exhaust temperatures so significantly that the turbomachinery may be required to be detuned (i.e., not used to its full potential). For example, in order to improve low rpm power/torque output, a turbo that produces high levels of boost may be used. However, at higher rpm, the turbo may create such high backpressure, that the turbomachinery must be detuned by routing some of the exhaust around the turbine (e.g., with a wastegate) or by making adjustments to engine management (e.g., timing, fuel delivery, air/fuel mixture, etc.). While this may alleviate the backpressure issue at high rpm, this reduces the amount of exhaust driving the turbine and, therefore, reduces the boost produced by the turbo. Thus, the turbo cannot be used to its full potential.

In addition, in some applications, it may be desirable to be able to reduce engine speed, while maintaining torque output. For example, in the natural gas industry, the gas may be transported via a pipeline. In order to pump the gas through the pipeline, gas compressors may be used. These gas compressors may be driven by some sort of engine. Most commonly, a natural gas burning engine is used, because it may use the pipeline as a source of fuel.

It may be desirable, at certain times, to reduce the flow of gas through the pipeline. For example, when maintenance must be performed on part of the pipeline (e.g., a valve needs to be replaced), it may be desirable to slow, but not cease, the pumping of the gas. For example, when a valve downstream of the gas compressor needs replacement, a valve may be closed upstream of the valve needing replacement and the gas compressor may continue to run at a slower speed, so as to gradually build pressure between the gas compressor and the closed valve. When the service is complete, the closed valve may be opened, and the gas compressor may be brought back up to normal operating speed.

The easiest way to vary the speed of a compressor is to vary the speed of the engine driving it. Further, it has been determined that, because these compressors operate with relatively low frictional losses and low pumping losses, in many cases, the same amount of torque is required to drive these compressors regardless of the speed at which the compressors are run. Therefore, when it is desired to slow down the speed of an engine to reduce the speed of a compressor, it is desired that the torque output of the engine be maintained constant as the speed of the engine is reduced. This control strategy is commonly referred to as "turndown" or "speed turndown."

It is also desirable to vary the speed of the compressor (and therefore the speed of the engine) over a wide operating range. This poses a challenge to produce a constant torque over a broad range of engine speeds.

In order to produce a constant torque over a broad range of engine speeds, systems have been developed that vary any of a number of engine operating parameters, such as, for example, turbo boost. Some systems vary turbo boost by using a turbo compressor bypass or an exhaust wastegate. As described above, however, the range of performance of a turbocharger can be limited by backpressure and exhaust temperature factors.

U.S. Pat. No. 6,343,473, issued to Kanesaka (the '473 patent), discloses an engine with an induction system including both a supercharger having a bypass, and a turbocharger. The engine in the '473 patent is disclosed as allegedly having the capability of producing a flat BMEP curve over a portion of its range of operating speeds.

The '473 patent, however, discloses that the engine is a diesel engine and not a natural gas engine. In addition, the '473 patent only discloses constant torque over less than half of its operating speeds.

Further, the system of the '473 patent is designed to purportedly solve problems that are not even posed by natural gas engines, particularly engines used for natural gas pipeline compression. For example, the supercharger disclosed in the '473 patent was purportedly added to reduce or eliminate turbo lag. However, for a steady state gas compression system, turbo lag is not an issue. Also, the '473 patent discloses the use of the supercharger in order to increase the amount of air delivered to the engine on startup, whereas natural gas engines tend to require intake throttling to reduce the intake charge delivered to the engine on startup. Furthermore, steady state gas compression systems are operated around the clock, 24 hours per day, so startup is a fairly infrequent occurrence. Accordingly, the '473 patent does not provide a solution for achieving broad ranges of speed turndown in natural gas engines, particularly those used for natural gas compression.

The present disclosure is directed to improvements in the ability of gas compression systems to undergo turndown, i.e., improvements in the range of turndown.

SUMMARY

In one aspect, the present disclosure is directed to a natural gas compression system. The system may include a natural gas compressor configured to compress, and thereby pump, natural gas through a pipeline. The system may also include a natural gas burning engine operatively coupled to the natural gas compressor, the engine being supplied with air by an induction system. The induction system may include a supercharger driven by the engine and configured to compress intake air. The induction system may further include a turbocharger downstream from the supercharger and driven by exhaust gases produced by the engine. In addition, the induction system may include a supercharger compressor bypass configured to selectively recirculate a portion of the compressed output of the supercharger upstream of the supercharger.

In another aspect, the present disclosure is directed to a natural gas burning engine. The engine may include an induction system configured to deliver air to the engine. The induction system may include a supercharger driven by the engine and configured to compress intake air. The induction system may also include a turbocharger downstream from the supercharger and driven by exhaust gases produced by the engine. In addition, the induction system may include a supercharger compressor bypass configured to selectively recirculate a portion of the compressed output of the supercharger upstream of the supercharger.

In another aspect, the present disclosure is directed to a method of pumping natural gas through a pipeline. The method may include supplying air to a natural gas burning engine with a supercharger driven by the engine and configured to compress intake air, and a turbocharger downstream from the supercharger and driven by exhaust gases produced by the engine. The method may also include selectively recirculating a portion of the compressed output of the supercharger upstream of the supercharger with a supercharger compressor bypass. Further, the method may include driving a gas compressor with the engine and compressing the natural gas with the gas compressor, thereby pumping the natural gas through the pipeline.

In another aspect, the present disclosure is directed to a natural gas burning engine including an induction system configured to deliver air to the engine. The induction system may include a turbocharger driven by exhaust gases produced by the engine and a supercharger downstream from the turbocharger, driven by the engine, and configured to compress intake air. The induction system may also include a supercharger compressor bypass configured to selectively recirculate a portion of the compressed output of the supercharger upstream of the supercharger.

DETAILED DESCRIPTION

Figure 1:
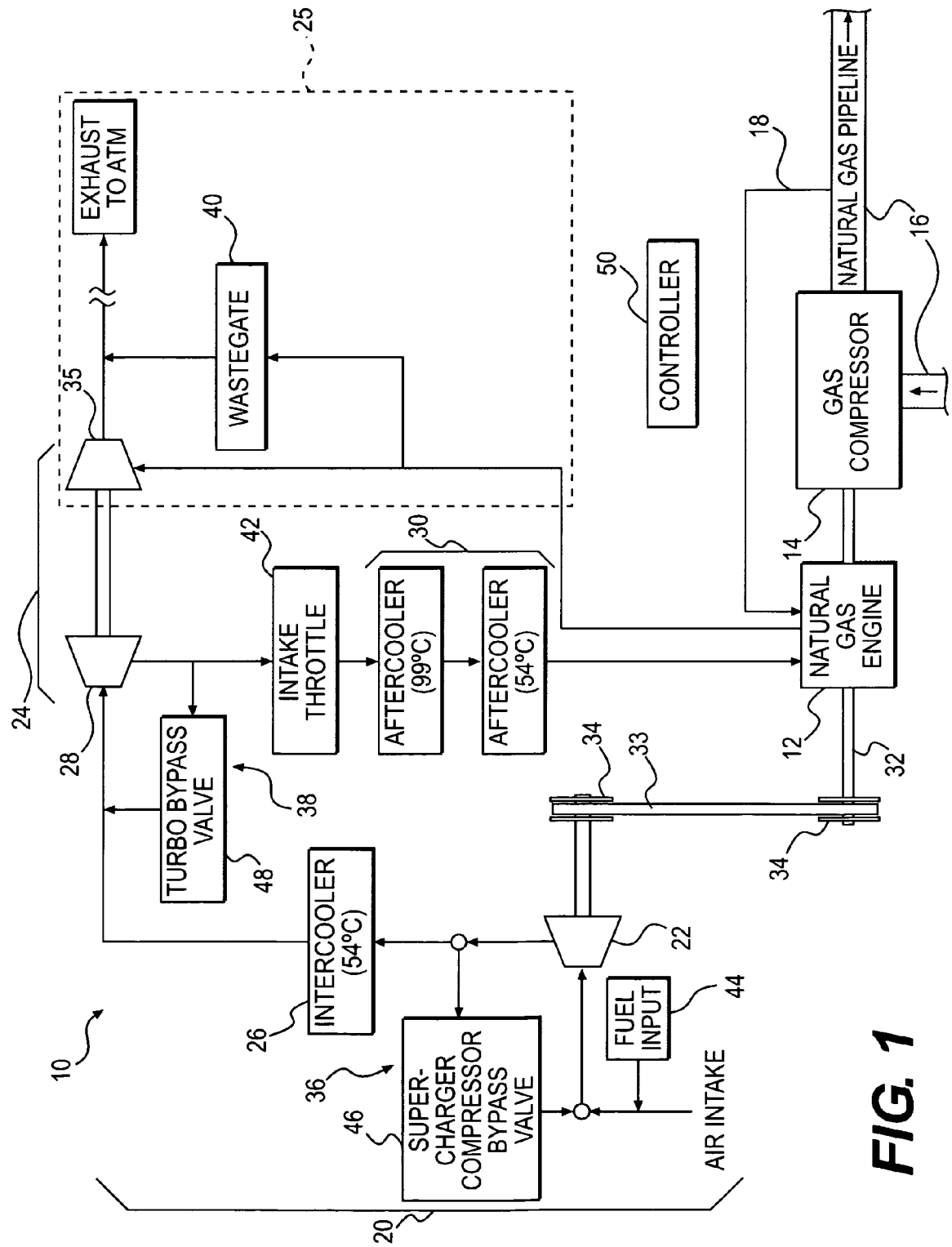
FIG. 1 is a diagrammatic representation of a natural gas compression system according to an exemplary disclosed embodiment.

FIG. 1 shows an exemplary natural gas compression system 10. The system 10 may include an engine 12. In some embodiments, the engine 12 may be a natural gas, or other gaseous fuel-burning engine. However, the air induction and engine management concepts discussed herein may apply to any combustion engine, e.g., gasoline, diesel, etc.

For purposes of this disclosure, the term "natural gas" will be used to refer to any kind of gaseous fossil fuel. Natural gas is primarily comprised of methane, but may include various amounts of other gases, such as ethane, propane, butane, carbon dioxide, nitrogen, helium, and hydrogen sulfide. The term natural gas, as used herein, includes fuel grade natural gas, which typically is mostly methane that has been purified to remove most of the other constituents mentioned above.

The engine 12 may be operatively coupled to a gas compressor 14, which may be configured to compress and, thereby, pump natural gas through a pipeline 16. In some embodiments, the engine 12 may utilize the flow of natural gas in the pipeline 16 as a source of fuel, as shown by a fuel supply line 18.

The engine 12 may employ a two-stage induction system 20 configured to deliver air to the engine. In the induction system 20, intake air may be first compressed by a supercharger 22, and then further compressed by a turbocharger 24 driven by the exhaust flowing through an exhaust system 25 of the engine 12. As shown in FIG. 1, the induction system 20 may be configured to deliver intake air (or, in the case of a natural gas engine, a mixture of air and fuel) to the supercharger 22.

Figure 2:
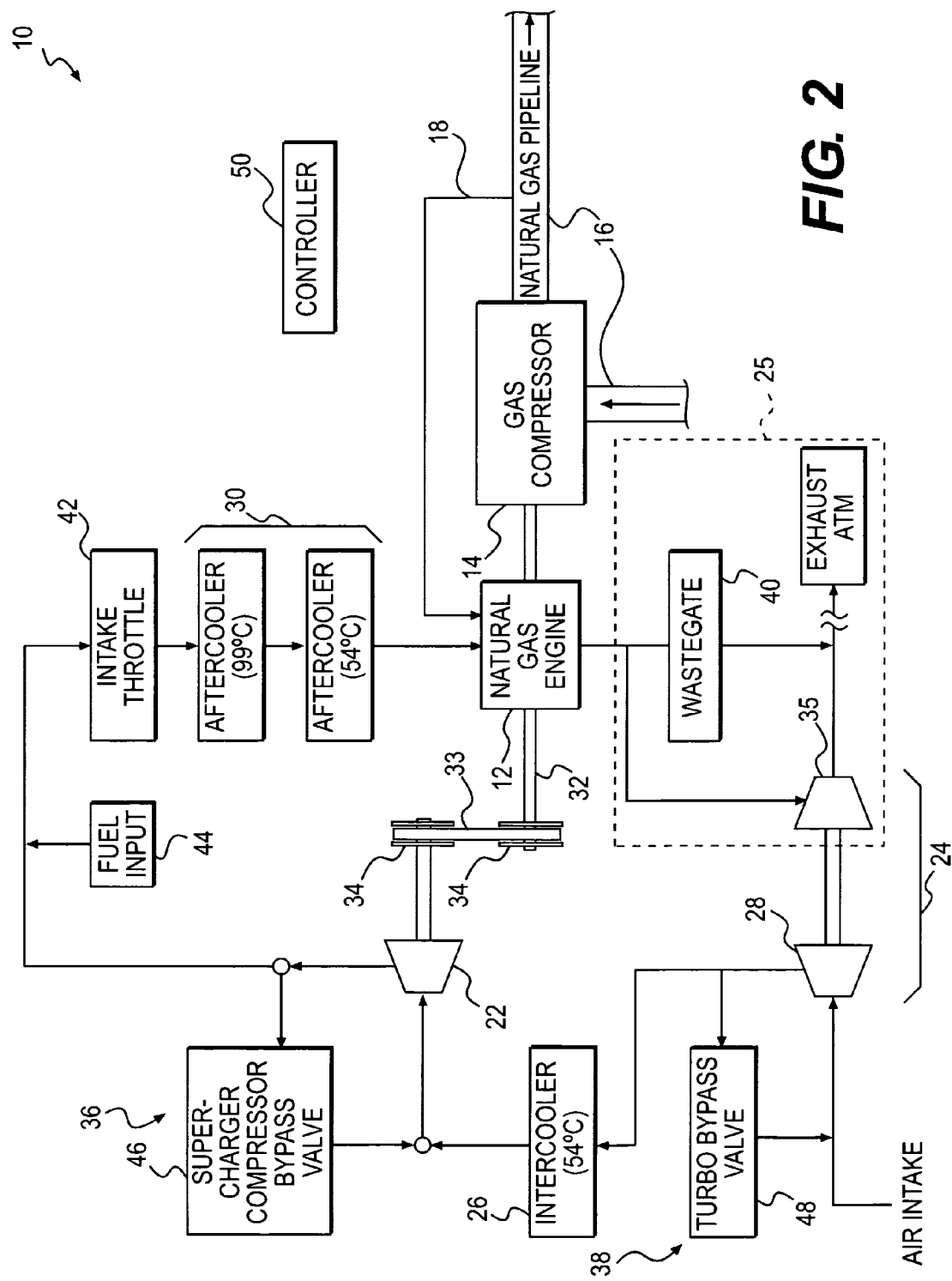
FIG. 2 is a diagrammatic representation of a natural gas compression system according to an alternative, exemplary embodiment.

In some embodiments, the output of the supercharger 22 may be cooled with an intercooler 26 before being delivered to a turbo compressor 28. The intercooler 26 may be supplied with coolant (e.g., water) that is at any suitable temperature for cooling down intake air upstream from the turbocharger 24 to within a desired temperature range. For example, in some embodiments, coolant may be delivered at 54° C., as shown in FIGS. 1 and 2.

The output of the turbo compressor 28 may be routed to the combustion chambers of the engine 12. Along the way, the intake charge may be further cooled by one or more aftercoolers 30. Coolant (e.g., water) supplied to the aftercoolers 30 may be delivered at any suitable temperature for cooling the intake air (or air and fuel mixture). For example, as shown in FIGS. 1 and 2, the aftercoolers 30 may be supplied with coolant at different temperatures, such as, 99° C. and 54° C.

In alternative embodiments, intake air may be routed first to a turbocharger and second to a supercharger. For example, in some embodiments, the supercharger 22 may be located downstream from the turbocharger 24 (as shown in FIG. 2).

With further regard to FIG. 1, the supercharger 22 may be any type of supercharger (e.g., roots, centrifugal, etc.). The supercharger 22 may be driven directly or indirectly by the engine 12. For example, as shown diagrammatically in FIG. 1, the supercharger 22 may include a centrifugal compressor driven by the engine 12, for example, via a crankshaft 32. The supercharger 22 may be connected to the crankshaft 32 with a belt 33 and one or more pulleys 34, as shown in FIG. 1. Alternatively, the supercharger 22 may be connected to the crankshaft 32 with a chain and sprockets or other power transmission mechanism.

The turbocharger 24 may include the turbo compressor 28 driven by exhaust flow produced by the engine 12, which turns a turbine 35. Although FIG. 1 illustrates a single supercharger and a single turbocharger, the system 10 may include multiple superchargers and/or multiple turbochargers working together. For example, engines having multiple banks of cylinders (e.g., V-type configurations, such as V6, V8, V10) may have multiple supercharger and turbocharger sets, i.e., one for each cylinder bank. In some embodiments, a single supercharger may feed dual turbochargers. In other embodiments, dual superchargers may feed a single turbocharger. In alternative embodiments, dual turbochargers may feed a single supercharger or a single turbocharger may feed dual superchargers.

In order to achieve a broad range of speed turndown (i.e., maintain a constant or substantially constant torque output over a wide range of engine speeds), the flow of intake charge (i.e., compressed intake air or intake mixture) may be controlled by one or more flow regulating mechanisms. For example, the induction system 20 may include a supercharger compressor bypass 36, a turbo compressor bypass 38, a wastegate 40, an intake throttle 42, and/or a fuel input device 44.

The supercharger compressor bypass 36 may be configured to selectively permit pressurized gas output from the supercharger 22 to be recirculated back to the intake track upstream of the supercharger 22. Accordingly, the supercharger compressor bypass 36 may include at least one supercharger compressor bypass valve 46 or other flow regulating devices. By recirculating some of the compressor output, less intake flow and, therefore, a lower pressure charge may be delivered to the turbocharger 24, and consequently to the engine 12.

The turbo compressor bypass 38 may be configured to operate much like the supercharger compressor bypass 36 in that the turbo compressor bypass 38 may selectively recirculate turbo compressor output upstream of the turbo compressor 28. Like the supercharger compressor bypass 36, the turbo compressor bypass 38 may include at least one turbo compressor bypass valve 48 or other flow regulating devices. Recirculation of the turbo compressor output may also be used to reduce the flow, and therefore pressure, of the intake charge ultimately delivered to the engine 12.

The wastegate 40 may be configured to selectively allow engine exhaust to bypass turbine 35 and continue on through the exhaust system 25. Controlled operation of the wastegate 40 may result in controlled variation of boost provided to the engine 12.

The intake throttle 42 may be located between the turbocharger 24 and the engine 12 (as shown in FIG. 1) or between the supercharger 22 and the engine 12 (as shown in FIG. 2). In either type of embodiment, the intake throttle 42 may be positioned either upstream or downstream of any aftercooler in the induction system 20 (e.g., upstream or downstream of either or both of the aftercoolers 30).

The intake throttle 42 may be configured to regulate flow of the intake charge to the engine 12. In some embodiments of the natural gas engine 12, throttle 42 may be configured to control not only the amount of air flow to the engine, but also the air/fuel mixture. In other embodiments, the air/fuel mixture may be controlled by controlling the fuel input device 44. In such embodiments, the throttle 42 may simply control mass flow to the engine 12.

In some embodiments, the fuel input device 44 may include, for example, a carburetor or other air/fuel ratio metering device. Such air/fuel ratio metering devices may be located at any location upstream of the intake throttle 42, such as upstream of the supercharger 22 (as shown in FIG. 1) or closer to the intake throttle 42 (as shown in FIG. 2). In other embodiments, the fuel input device 44 may include a fuel injector, which may be positioned at any location along the intake track of the induction system 20. Some embodiments may feature port injection. Such embodiments may utilize the intake throttle 42 to control air/fuel ratio as well.

The system 10 may include a controller 50 configured to control operation of the various components described above. For example, the controller 50 may be configured to control operation of the supercharger compressor bypass 36 (via control of the supercharger compressor bypass valve 46), the turbo compressor bypass 38 (via control of the turbo compressor bypass valve 48), the wastegate 40, the throttle 42, and/or the fuel input device 44. Ultimately, both the mass flow and air/fuel ratio may be determined by a combination of the induction system components working in concert with one another.

In some embodiments, the controller 50 may perform other operations associated with system 10. For example, in some embodiments, the controller 50 may be an engine control module (ECM), and thus, may be configured to perform other engine management functions for the engine 12, such as controlling timing, air/fuel mixture, knock control, and other various functions related to performance, emissions, etc. The controller 50 may base control of these components and parameters on information collected from various sensors, such as pressure sensors, temperature sensors, etc.

For embodiments of the system 10 wherein the engine 12 is a natural gas engine, the controller 50 may be configured to control the intake throttle 42 to reduce the intake charge delivered to the engine 12 during engine startup. Whereas gasoline or diesel engines often use forced induction to provide extra air to the engine during startup, for natural gas engines a much lower intake charge pressure may be desired. For example, for some natural gas engines, an intake charge pressure below atmospheric pressure may be desired. The system 10 may be configured to provide the engine 12 with such a reduced pressure by controlling the intake throttle 42 with the controller 50.

INDUSTRIAL APPLICABILITY

The disclosed system may be applicable to any type of combustion engine, including natural gas engines, gasoline engines, diesel engines, etc. The disclosed system may include both a turbocharger and a supercharger utilized in series. Intake air compressed by the supercharger may be delivered to the inlet of the turbo compressor. This may reduce the work required to drive the turbo compressor, thus reducing backpressure in the exhaust system upstream of the turbo compressor. Reducing the backpressure leads to a reduction in exhaust temperatures. By reducing backpressure and exhaust temperatures, performance of the engine may be significantly increased, particularly at higher rpm and at high altitude, because timing need not be retarded to the same extent and turbomachinery need not be detuned to the same extent.

In addition, utilization of the supercharger in conjunction with the turbocharger may, in some embodiments, eliminate the need for a wastegate. In other embodiments, a wastegate may be employed to further broaden the range of engine speeds over which torque output may be maintained constant or substantially constant (i.e., to provide a broad range of speed turndown).

The componentry and control strategy of the system 10 may be configured to operate the engine 12 with a constant, or substantially constant, torque output as the engine speed of the engine 12 and the corresponding speed of the gas compressor 14 are reduced during speed turndown. Because the induction system 20 of the engine 12 may include a number of flow regulation devices that, in some embodiments, may be individually controlled, the engine 12 may be capable of producing a constant, or substantially constant, torque output over a broad range of engine speeds. In some embodiments, a constant, or substantially constant, torque output may be produced over substantially the entire range of operating speeds of the engine 12.

For purposes of this disclosure, the term "substantially constant torque" shall refer to torque output that does not vary appreciably. For example, an exemplary embodiment of a natural gas version of the engine 12, which is used to drive a compressor on a natural gas pipeline, may maintain a substantially constant torque output of 3400 N-m±170 N-m (2508 lb-ft±125 lb-ft) through the normal range of engine operating speeds.

The disclosed system may be employed for use in industrial natural gas compression for the purpose of pumping natural gas through a pipeline. An exemplary method of pumping natural gas through a pipeline may include supplying air to a natural gas burning engine with a supercharger driven by the engine and configured to compress intake air, and a turbocharger downstream from the supercharger and driven by exhaust gases produced by the engine. The method may also include selectively recirculating a portion of the compressed output of the supercharger upstream of the supercharger with a supercharger compressor bypass. Further, the method may include driving a gas compressor with the engine and compressing the natural gas with the gas compressor, thereby pumping the natural gas through the pipeline.

The method may also include performing a speed turndown wherein engine torque output is maintained substantially constant while engine speed is reduced. The speed turndown may be orchestrated by controlling components of the induction system with a controller.

It will be apparent to those having ordinary skill in the art that various modifications and variations can be made to the disclosed natural gas compression system without departing from the scope of disclosed embodiments. Other embodiments of the disclosed system will be apparent to those having ordinary skill in the art from consideration of the specification and practice of the systems and methods disclosed herein. It is intended that the specification and examples be considered as exemplary only, with a true scope of the disclosed concept being indicated by the following claims and their equivalents.

What is claimed is:

1. A natural gas compression system, comprising:
   a natural gas compressor configured to compress, and thereby pump, natural gas through a pipeline;
   a natural gas burning engine, operatively coupled to the natural gas compressor to drive the natural gas compressor, the engine being supplied with an intake charge of a mixture of air and natural gas by an induction system including:
      a supercharger driven by the engine and configured to compress the intake charge;
      a turbocharger downstream from the supercharger and driven by exhaust gases produced by the engine; and
      a supercharger compressor bypass configured to selectively recirculate a portion of a compressed output of the supercharger to upstream of the supercharger.

2. The system of claim 1, further including a turbo compressor bypass configured to selectively recirculate a portion of a compressed turbo compressor output upstream of a turbo compressor of the turbocharger.

3. The system of claim 1, further including a wastegate configured to selectively route a portion of the exhaust gases past a turbine of the turbocharger.

4. The system of claim 1, wherein the engine is configured to perform a speed turndown wherein engine torque output is maintained substantially constant while engine speed is reduced to reduce the speed of the gas compressor.

5. The system of claim 4, further including a controller configured to control components of the system to perform the speed turndown.

6. The system of claim 1, wherein the natural gas that fuels the engine is introduced into the induction system upstream from the supercharger.

7. The system of claim 1, further including an intake throttle positioned downstream from the supercharger and the turbocharger, the intake throttle being configured to regulate the intake charge delivered to the engine.

8. The system of claim 7, further including a controller configured to control the intake throttle, wherein the controller is configured to reduce the intake charge delivered to the engine during engine startup.

9. A natural gas burning engine, comprising:
   an induction system configured to deliver an intake charge of a mixture of air and natural gas to the natural gas burning engine, the induction system including:
      a supercharger driven by the engine and configured to compress the intake charge;
      a turbocharger downstream from the supercharger and driven by exhaust gases produced by the engine; and
      a supercharger compressor bypass configured to selectively recirculate a portion of a compressed output of the supercharger to upstream of the supercharger.

10. The engine of claim 9, wherein the induction system further includes a turbo compressor bypass configured to selectively recirculate a portion of a compressed turbo compressor output upstream of a turbo compressor of the turbocharger.

11. The engine of claim 9, wherein the induction system further includes a wastegate configured to selectively route at least some of the exhaust gases past a turbine of the turbocharger.

12. The engine of claim 9, further configured to perform a speed turndown wherein engine torque output is maintained substantially constant while engine speed is reduced.

13. The engine of claim 12, wherein a controller is configured to control components of the induction system to perform the speed turndown.

14. The engine of claim 9, wherein the natural gas that fuels the engine is introduced into the induction system upstream from the supercharger.

15. The engine of claim 9, further including an intake throttle positioned downstream from the supercharger and the turbocharger, the intake throttle being configured to regulate the intake charge delivered to the engine.

16. The engine of claim 15, further including a controller configured to control the intake throttle, wherein the controller is configured to reduce the intake charge delivered to the engine during engine startup.

17. A method of pumping natural gas through a pipeline, comprising:
   supplying an intake charge of a mixture of air and natural gas to a natural gas burning engine with a supercharger driven by the engine and configured to compress the intake charge, and a turbocharger downstream from the supercharger and driven by exhaust gases produced by the engine;
   selectively recirculating at least some of a compressed output of the supercharger to upstream of the supercharger with a supercharger compressor bypass;
   driving a gas compressor with the engine; and
   operating the gas compressor to pump natural gas through the pipeline.

18. The method of claim 17, further including:
   performing a speed turndown wherein engine torque output of the engine is maintained substantially constant while engine speed of the engine is reduced.

19. The method of claim 18, wherein the speed turndown is orchestrated by controlling components of the induction system with a controller.

* * * * *